(12) United States Patent
Pan et al.

(10) Patent No.: US 11,734,853 B1
(45) Date of Patent: Aug. 22, 2023

(54) ANTENNA BOARD ALIGNMENT METHOD

(71) Applicant: GRAND-TEK TECHNOLOGY CO., LTD., New Taipei (TW)

(72) Inventors: Chien-Hung Pan, New Taipei (TW); Chun-Chien Chueh, New Taipei (TW); Chien-Wen Hung, New Taipei (TW)

(73) Assignee: GRAND-TEK TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/091,830

(22) Filed: Dec. 30, 2022

(30) Foreign Application Priority Data

Aug. 16, 2022 (TW) .................................. 111130831

(51) Int. Cl.
 *G06T 7/73* (2017.01)
 *G06T 7/13* (2017.01)
 *G06T 7/90* (2017.01)
(52) U.S. Cl.
 CPC .................. *G06T 7/73* (2017.01); *G06T 7/13* (2017.01); *G06T 7/90* (2017.01); *G06T 2207/10024* (2013.01); *G06T 2207/20021* (2013.01); *G06T 2207/30108* (2013.01)
(58) Field of Classification Search
 CPC ............... G06T 7/73; G06T 7/13; G06T 7/90
 See application file for complete search history.

(56) References Cited

U.S. PATENT DOCUMENTS

| 10,795,270 | B2 * | 10/2020 | Yu .......................... | G06T 7/0006 |
| 2017/0091519 | A1 * | 3/2017 | Chen ..................... | G06V 40/193 |

FOREIGN PATENT DOCUMENTS

| TW | I541765 B | 7/2016 |
| TW | I675253 B | 10/2019 |

OTHER PUBLICATIONS

Office Action dated Mar. 17, 2023 of the corresponding Taiwan patent application No. 111130831.

* cited by examiner

*Primary Examiner* — Jason L Vaughan
*Assistant Examiner* — Amanda Kreiling
(74) *Attorney, Agent, or Firm* — Chun-Ming Shih; HDLS IPR Services (57) ABSTRACT

An antenna board alignment method includes following steps: A microprocessor finds a central positioning point on an antenna board to locate a positioning rectangle. The microprocessor finds four inner positioning points on the positioning rectangle to locate the antenna board. The microprocessor finds a plurality of outer positioning points at a plurality of edge locations on the antenna board to locate at least one edge of the antenna board.

10 Claims, 8 Drawing Sheets

ANTENNA BOARD ALIGNMENT METHOD

BACKGROUND OF THE DISCLOSURE

Technical Field

The present disclosure relates to an alignment method, and especially relates to an antenna board alignment method.

Description of Related Art

In recent years, the image processing technology has been widely used in the industry to detect the product defects, thereby improving the product quality and the production efficiency. Although the image processing technology has been used in the industry for a period of time, the image processing technology is still not widely used in the complex industrial processes, such as the detections of pits, holes and locked screws. While taking into account some factors such as the light, color, shape, size and strength, such pits, holes, and locked screws are not easy to be directly recognized by the human eyes.

However, the current manufacturing factories, such as the antenna manufacturing factories, are always looking to achieve a higher level of automated missing detection. One of the main tasks of the antenna manufacturing factory in the antenna manufacturing process is to correctly lock the screws to the antenna board, so the antenna manufacturing factory hopes to minimize the missing of the locking screw process. The screw is designed to be fastened to the position in the hole, so as to realize the high precision, safety, and stability of the antenna product. Therefore, detecting whether the screws are correctly locked is very important for the manufacture of the antenna board.

Currently, the related art edge detection technology uses a threshold value to assist the defect detection in the grayscale images. There are several important points here: first, Dilation and Erosion are used to expand and shrink the shapes respectively; second, the morphological opening is accomplished by eroding the distorted image, which can be used to remove small objects in the image to preserve the shape and larger objects; third, the morphological closing is accomplished by dilating the eroded image, filling the small gaps in the image to preserve the shape and objects; fourth, the noises and the high frequency effects of the edges are removed by the blurring technique to smooth the image.

For the related art edge detection technologies, the techniques of Sobel, Kirsch, Prewitt, and Canny use two masks to convolve a grayscale image to obtain vertical and horizontal directions. However, if the color of the antenna board is similar to the color of the screw head (for example, both are silver), distinguishing whether there is a locked screw in the screw hole is difficult; this is because when using the techniques of Sobel, Kirsch, Prewitt, and Canny mentioned above, similar pixels between the screw and the antenna board become insensitive through the masks, resulting in incorrect related art edge detection technologies.

For the screw hole position detection method of the antenna board, correctly aligning the antenna board is very important; if the antenna board is not correctly aligned, correctly determining whether the screw hole has a locked screw is impossible; however, currently there is no simple and accurate antenna board alignment method.

SUMMARY OF THE DISCLOSURE

In order to solve the above-mentioned problems, an object of the present disclosure is to provide an antenna board alignment method.

In order to achieve the object of the present disclosure mentioned above, the antenna board alignment method of the present disclosure includes following steps: A microprocessor finds/calculates a central positioning point on an antenna board to locate a positioning rectangle. The microprocessor finds/calculates four inner positioning points on the positioning rectangle to locate the antenna board. The microprocessor finds/calculates a plurality of outer positioning points at a plurality of edge locations on the antenna board to locate at least one edge of the antenna board.

Moreover, in an embodiment of the antenna board alignment method of the present disclosure mentioned above, the antenna board is a rectangular antenna board.

Moreover, in an embodiment of the antenna board alignment method of the present disclosure mentioned above, the four inner positioning points are four heat radiation holes on the antenna board.

Moreover, in an embodiment of the antenna board alignment method of the present disclosure mentioned above, the microprocessor uses a camera to photograph the antenna board to find the central positioning point, the positioning rectangle, the inner positioning points, and the outer positioning points.

Moreover, in an embodiment of the antenna board alignment method of the present disclosure mentioned above, the antenna board alignment method further includes following step: Before the microprocessor finds the central positioning point on the antenna board, the antenna board is placed in a place, wherein a setting color of the place is different from an antenna board color of the antenna board.

Moreover, in an embodiment of the antenna board alignment method of the present disclosure mentioned above, the setting color is black.

Moreover, in an embodiment of the antenna board alignment method of the present disclosure mentioned above, the antenna board color is silver.

Moreover, in an embodiment of the antenna board alignment method of the present disclosure mentioned above, the edge locations are four corners of the rectangular antenna board.

Moreover, in an embodiment of the antenna board alignment method of the present disclosure mentioned above, a positioning number of the outer positioning points is four.

Moreover, in an embodiment of the antenna board alignment method of the present disclosure mentioned above, an edge number of the at least one edge is four.

The advantage of the present disclosure is to provide a simple and accurate antenna board alignment method.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
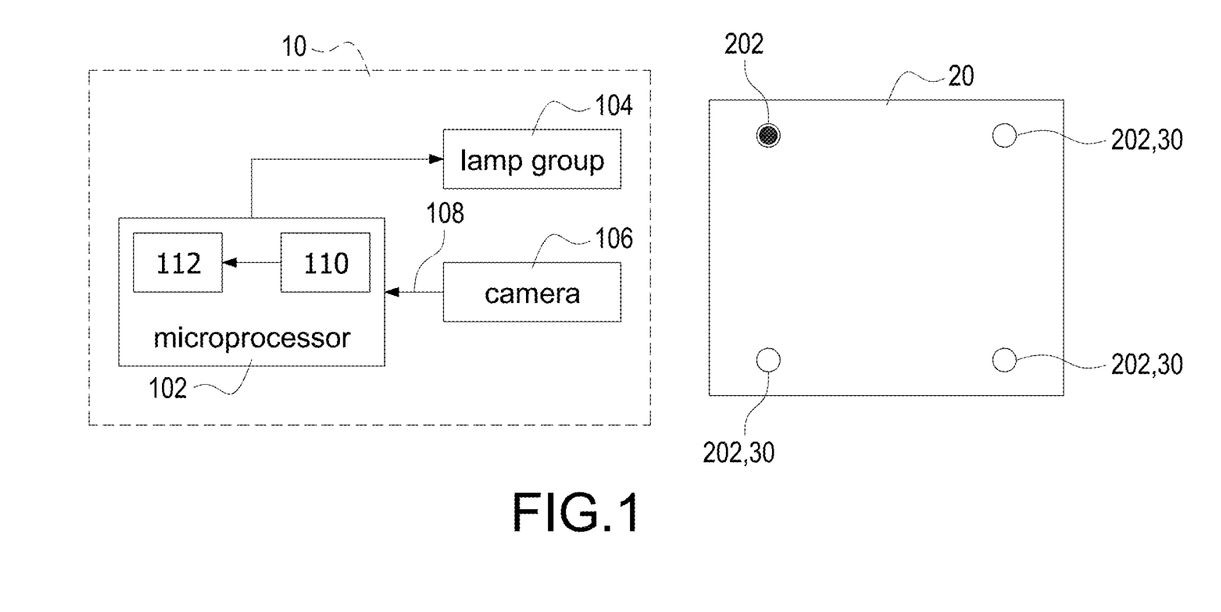
FIG. 1 shows a block diagram of the first embodiment of the screw hole position detecting apparatus applied to the antenna board alignment method of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the first embodiment of the screw hole position detecting apparatus applied to the antenna board alignment method of the present disclosure. The present disclosure is applied to a screw hole position detecting apparatus 10, an antenna board 20 and at least one screw 30. The screw hole position detecting apparatus 10 includes a microprocessor 102, a lamp group 104 and a camera 106. The antenna board 20 defines at least one screw hole 202. In FIG. 1, the antenna board 20 defines four screw holes 202. The black screw hole 202 in the upper left corner represents that the screw 30 is not locked (because the screw hole 202 is black and dull inside), and the other three white screw holes 202 represent that the screws 30 are locked (because the head of the screw 30 is silver). The purpose of the screw hole position detecting apparatus 10 is to find the screw hole 202 where the screw 30 is not locked in the upper left corner of FIG. 1.

First, the lamp group 104 is configured to illuminate the antenna board 20; then, the camera 106 is configured to photograph the antenna board 20 to obtain an original image 108 (which is a color image) and transmit the original image 108 to the microprocessor 102; then, the microprocessor 102 is configured to grayscale convert the original image 108 into a grayscale image 110, and convert the grayscale image 110 into a binarization image 112 based on a threshold value (which is described in details later); finally, based on the binarization image 112, whether the at least one screw hole 202 is locked into the at least one screw 30 is determined (which is described in details later). In an embodiment of the present disclosure but not limiting the present disclosure, the above-mentioned image processing uses an industrial camera CVG-500M-15RT (as the camera 106) and NVIDIA Jetson Nano development kit (which is arranged to be installed in the microprocessor 102, or used as the microprocessor 102).

Figure 2:
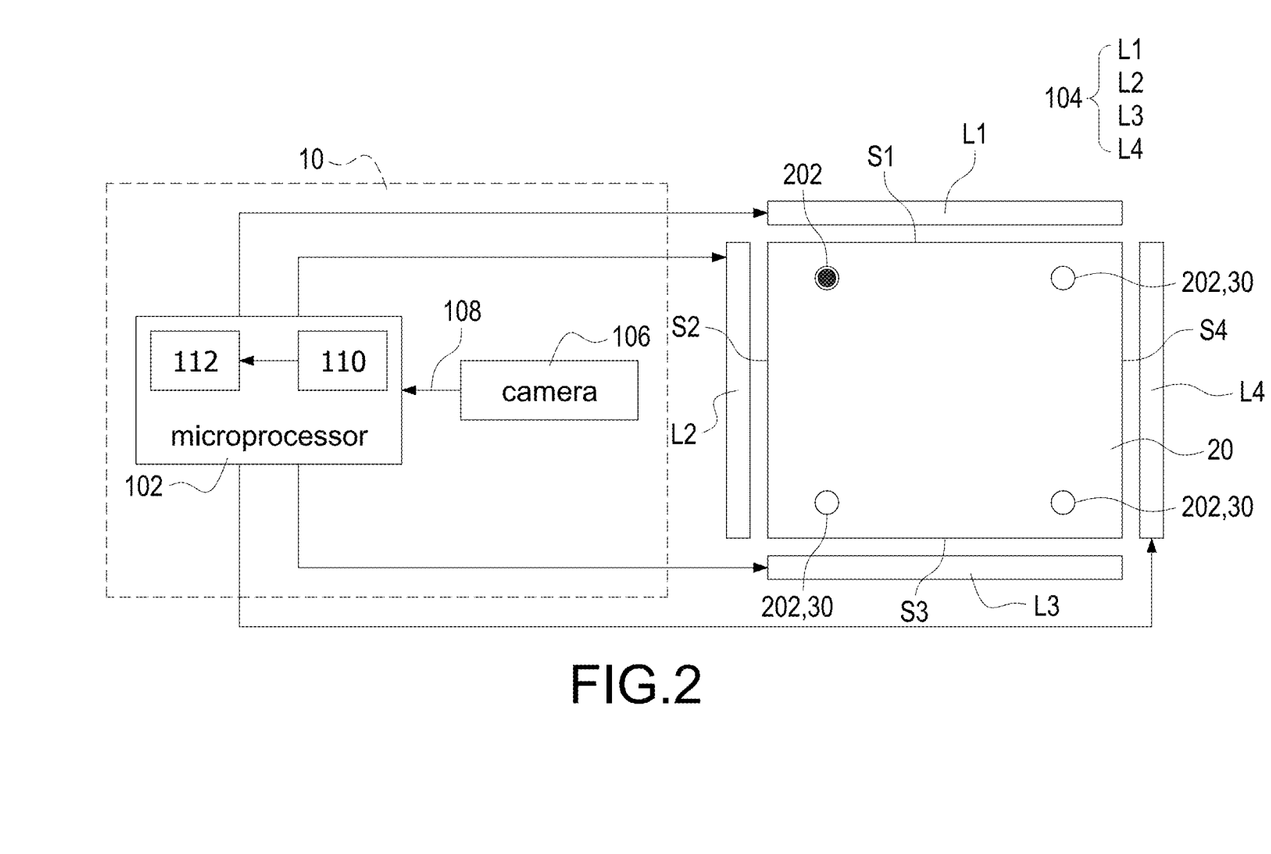
FIG. 2 shows a block diagram of the second embodiment of the screw hole position detecting apparatus applied to the antenna board alignment method of the present disclosure.

FIG. 2 shows a block diagram of the second embodiment of the screw hole position detecting apparatus applied to the antenna board alignment method of the present disclosure. The descriptions of the elements shown in FIG. 2 which are the same as the elements shown in FIG. 1 are not repeated here for brevity. The lamp group 104 includes a first lamp L1, a second lamp L2, a third lamp L3 and a fourth lamp L4. The first lamp L1 is configured to face a first side S1 of the antenna board 20 to laterally illuminate the first side S1 and the antenna board 20. The second lamp L2 is configured to face a second side S2 of the antenna board 20 to laterally illuminate the second side S2 and the antenna board 20. The third lamp L3 is configured to face a third side S3 of the antenna board 20 to laterally illuminate the third side S3 and the antenna board 20. The fourth lamp L4 is configured to face a fourth side S4 of the antenna board 20 to laterally illuminate the fourth side S4 and the antenna board 20.

In an embodiment of the present disclosure, the lamp group 104 has to illuminate the antenna board 20 uniformly and laterally. Since the antenna board 20 shown in FIG. 2 has four sides, the lamp group 104 has to include four lamps, and the four lamps are respectively arranged on the four sides of the antenna board 20 so as to uniformly and laterally illuminate the antenna board 20. In another embodiment of the present disclosure, the lamp group 104 may also be replaced by a ring type lamp, so as to illuminate the antenna board 20 uniformly and laterally.

The reason for illuminating the antenna board 20 laterally mentioned above is to make the screw holes 202 which are not locked into the screw 30 appear dark (so that the screw holes 202 which are not locked into the screw 30 are detected by the subsequent image processing). Vertically illuminating the antenna board 20 causes both the screw holes 202 without the locked screw 30 and the screw holes 202 with the locked screws 30 to appear bright (because the screw holes 202 without the locked screw 30 are illuminated and bright, while the screw holes 202 with the locked screws 30 are bright as well, so that the subsequent image processing cannot distinguish the screw holes 202 without the screw 30 and the screw holes 202 with the screws 30).

Figure 3:
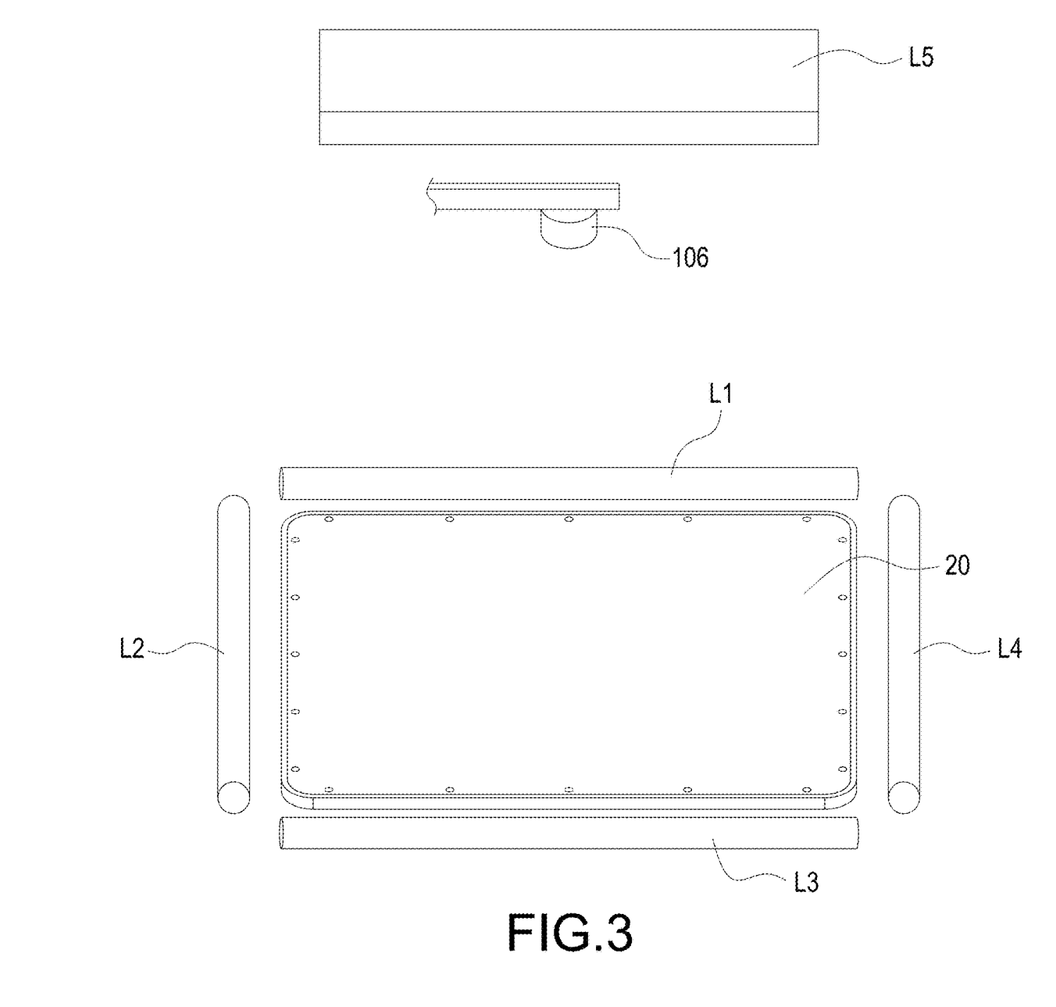
FIG. 3 shows an appearance drawing of the screw hole position detecting apparatus applied to the antenna board alignment method of the present disclosure.

FIG. 3 shows an appearance drawing of the screw hole position detecting apparatus applied to the antenna board alignment method of the present disclosure. In an embodiment of the present disclosure but not limiting the present disclosure, the lamp group 104 further includes a fifth lamp L5, so that the antenna board 20 is slightly illuminated by the fifth lamp L5, but the screw holes 202 which are not locked into the screw 30 are not too bright to be recognized by the image processing.

Figure 4:
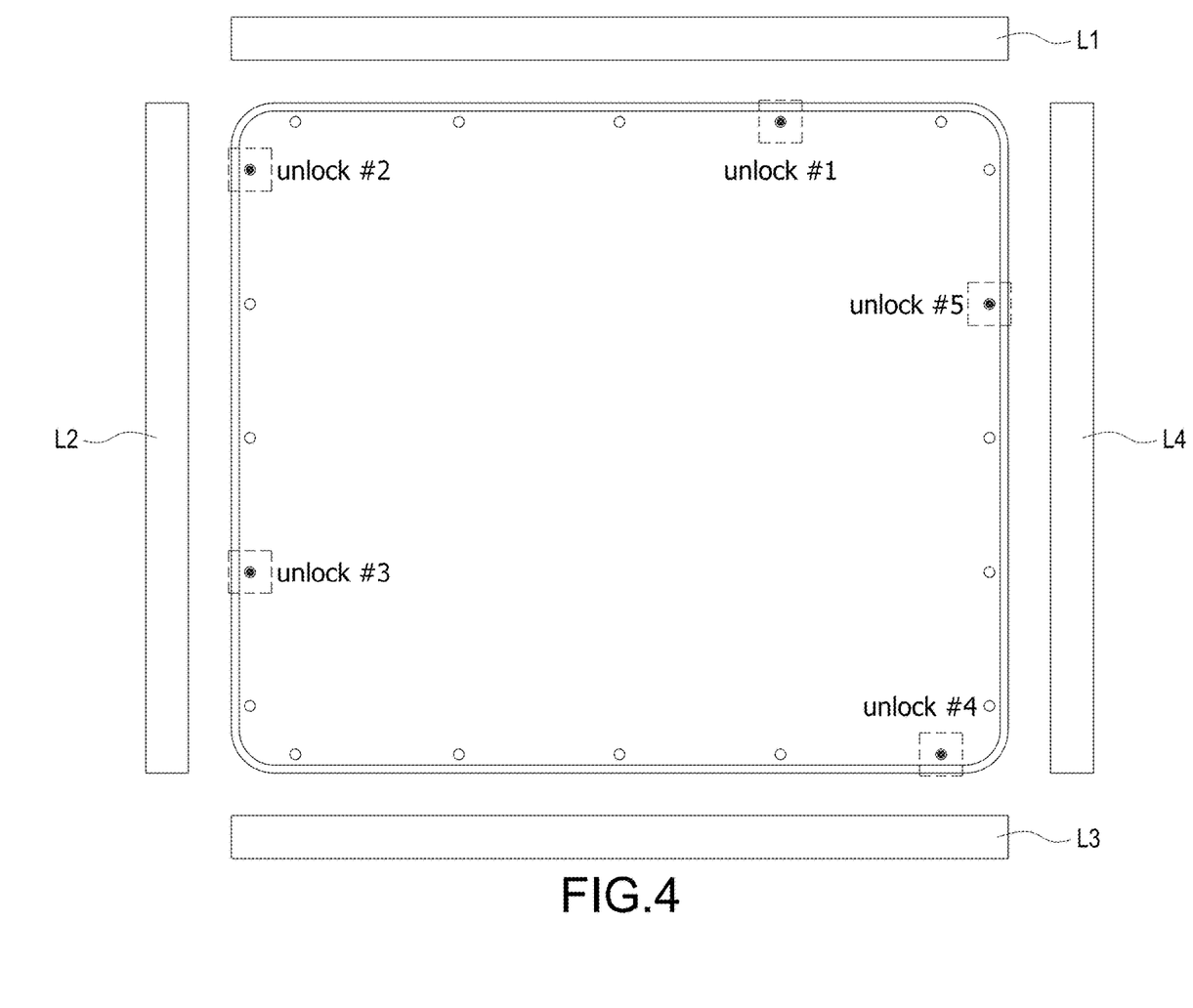
FIG. 4 shows a top view of the first lamp to the fourth lamp surrounding the antenna board applied to the antenna board alignment method of the present disclosure.

FIG. 4 shows a top view of the first lamp to the fourth lamp surrounding the antenna board applied to the antenna board alignment method of the present disclosure. In the embodiment of FIG. 4, the antenna board 20 has five screw holes (unlock #1-unlock #5) which are not locked into the screw.

Figure 5:
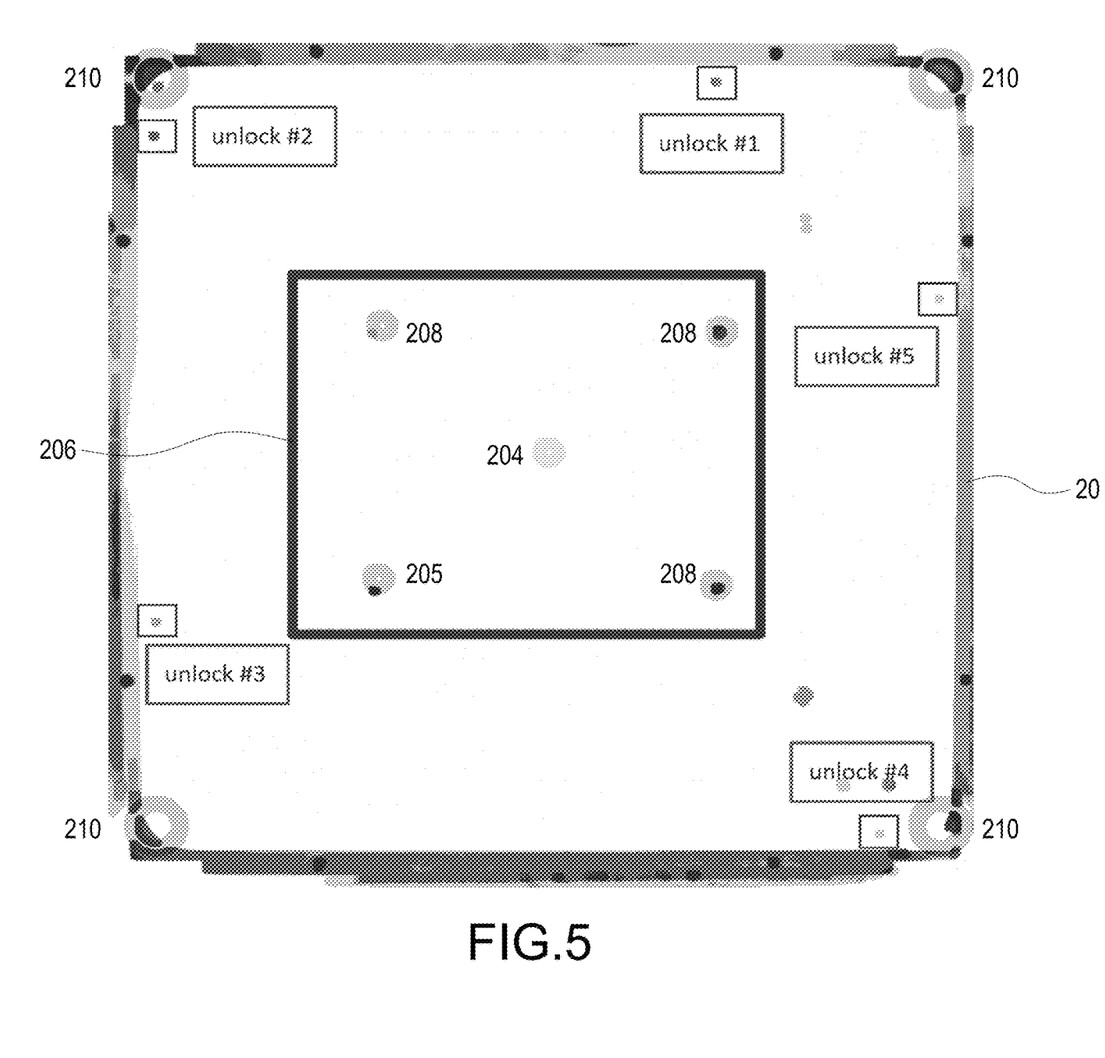
FIG. 5 shows a top view of the positioning points on the antenna board applied to the antenna board alignment method of the present disclosure.
Figure 8:
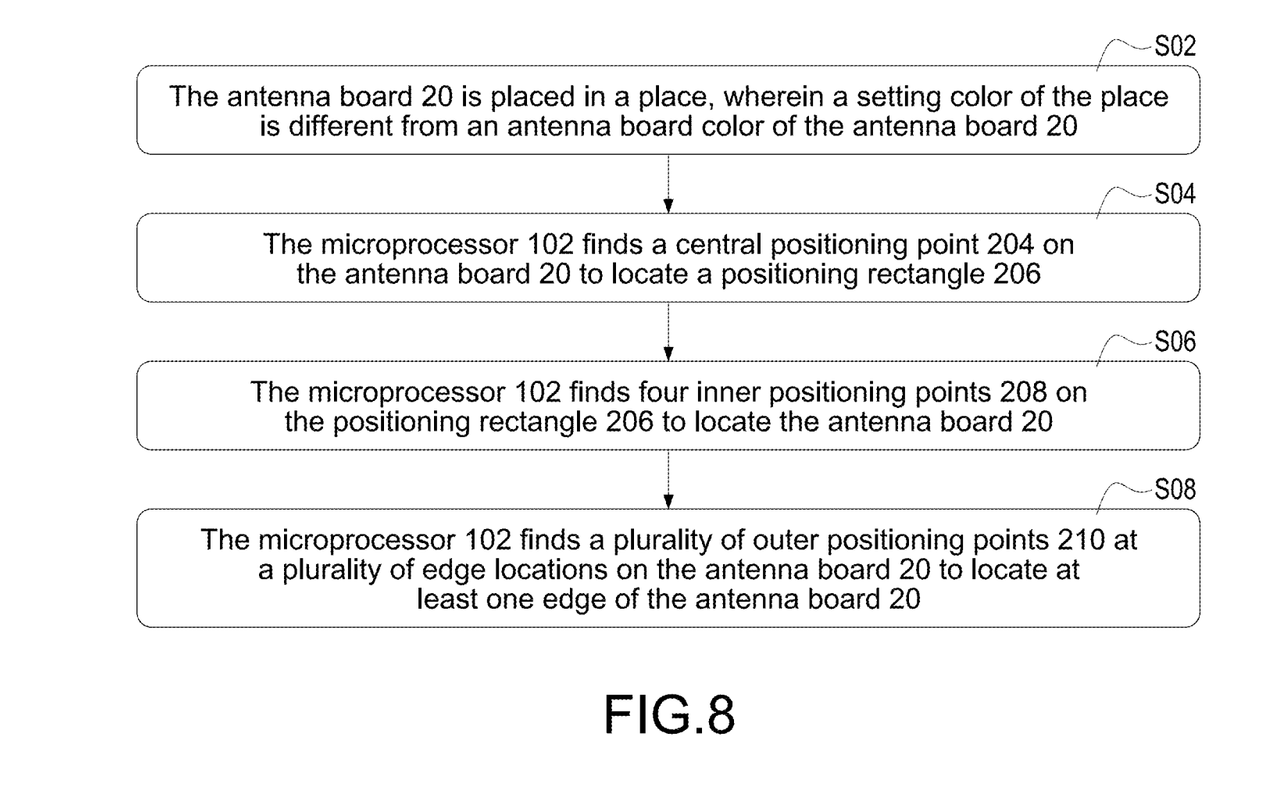
FIG. 8 shows a flow chart of the antenna board alignment method of the present disclosure.

FIG. 5 shows a top view of the positioning points on the antenna board applied to the antenna board alignment method of the present disclosure. FIG. 8 shows a flow chart of the antenna board alignment method of the present disclosure. Please refer to FIG. 1, FIG. 5, and FIG. 8 at the same time. The antenna board alignment method of the present disclosure includes following steps:

Step S02: The antenna board 20 is placed in a place, wherein a setting color of the place is different from an antenna board color of the antenna board 20. Moreover, the antenna board 20 is a rectangular antenna board. The setting color is, for example, black. The antenna board color is, for example, silver. The antenna board 20 which is silver is placed in the place which is black, for example, a black cloth or a black tabletop, so as to highlight the edges of the antenna board 20. Then, the antenna board alignment method goes to the step S04.

Step S04: The microprocessor 102 finds a central positioning point 204 on the antenna board 20 to locate a positioning rectangle 206. Moreover, for the antenna board 20 which is symmetrical, the microprocessor 102 can find the central positioning point 204 using the techniques such as the image processing and the geometric operations. After finding the central positioning point 204, the microprocessor 102 calculates and locates the positioning rectangle 206 from the central positioning point 204 using the techniques such as the image processing and the geometric operations as well. Then, the antenna board alignment method goes to the step S06.

Step S06: The microprocessor 102 finds four inner positioning points 208 on the positioning rectangle 206 to locate the antenna board 20. Moreover, the microprocessor 102 finds the four inner positioning points 208 on the positioning rectangle 206 using the techniques such as the image processing and the geometric operations as well. So far, basically the antenna board 20 is roughly positioned. Moreover, the four inner positioning points 208 are four heat radiation holes on the antenna board 20. Then, the antenna board alignment method goes to the step S08.

Step S08: The microprocessor 102 finds a plurality of outer positioning points 210 at a plurality of edge locations on the antenna board 20 to locate at least one edge of the antenna board 20. Moreover, the edge locations are four corners of the rectangular antenna board. A positioning number of the outer positioning points 210 is four. An edge number of the at least one edge is four. Moreover, the microprocessor 102 finds the outer positioning points 210 at the edge locations on the antenna board 20 to locate the at least one edge of the antenna board 20 using the techniques such as the image processing and the geometric operations as well.

With the above-mentioned antenna board alignment method, the microprocessor 102 can correctly locate the positions of the screw holes 202 to avoid incorrect determination or omission of the screw holes 202 which are not locked into the screw 30. Moreover, the microprocessor 102 uses the camera 106 to photograph the antenna board 20 to find the central positioning point 204, the positioning rectangle 206, the inner positioning points 208 and the outer positioning points 210.

In an embodiment of the present disclosure but not limiting the present disclosure, if the antenna board 20 which is silver in FIG. 5 is slightly shifted clockwise and is not correctly aligned, it may result in failure to detect, for example, the screw hole (unlock #4) which is not locked into the screw. At this time, the antenna board 20 which is silver may be shifted slightly counterclockwise to rearrange the offset position of the image to the correct position, since the background (the black cloth) may be used to distinguish the edge locations of the four outer positioning points 210 in the image by manual correction. In other words, if the background is white, which is similar to silver of the antenna board 20, finding the edge locations of the four outer positioning points 210 is harder.

In the actual production process of the factory, first the antenna board 20 mentioned above which has been predicted to have, for example, five screw holes (unlock #1-unlock #5) without the locked screw may be prepared to perform the antenna board alignment method mentioned above, so as to find the correct alignment position of the antenna board 20; then, a fixing jig is made according to the correct alignment position of the antenna board 20. Afterwards, when the operator checks whether the screw holes are locked into the screws, the operator only needs to put the antenna board 20 into the fixing jig.

Figure 6:
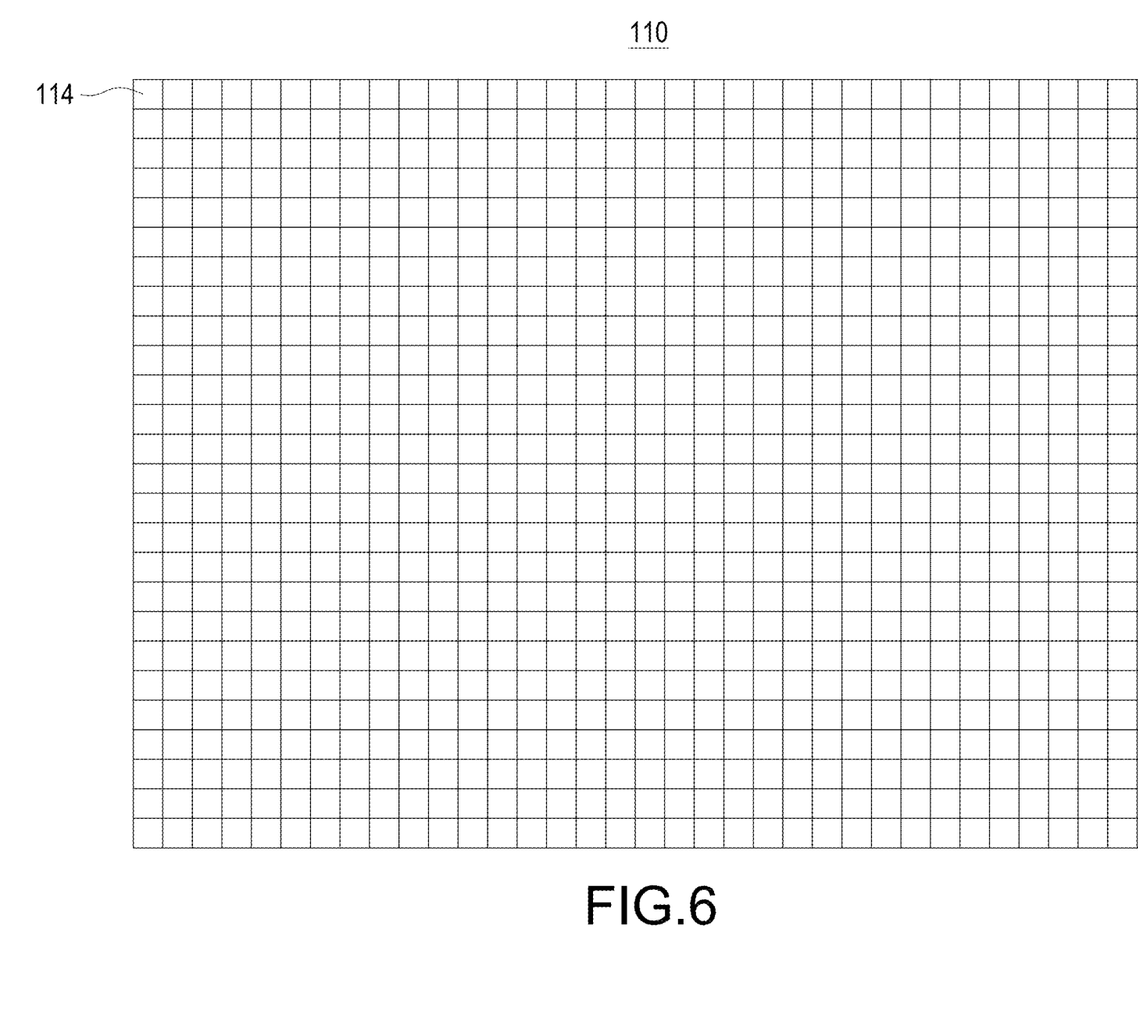
FIG. 6 shows a schematic diagram of a grayscale image including a plurality of pixels according to the present disclosure.

FIG. 6 shows a schematic diagram of the grayscale image 110 including a plurality of pixels 114 according to the present disclosure. FIG. 6 mainly illustrates that the grayscale image 110 may be divided into the pixels 114, while the pixels 114 include a plurality of pixel grayscale values.

Figure 7:
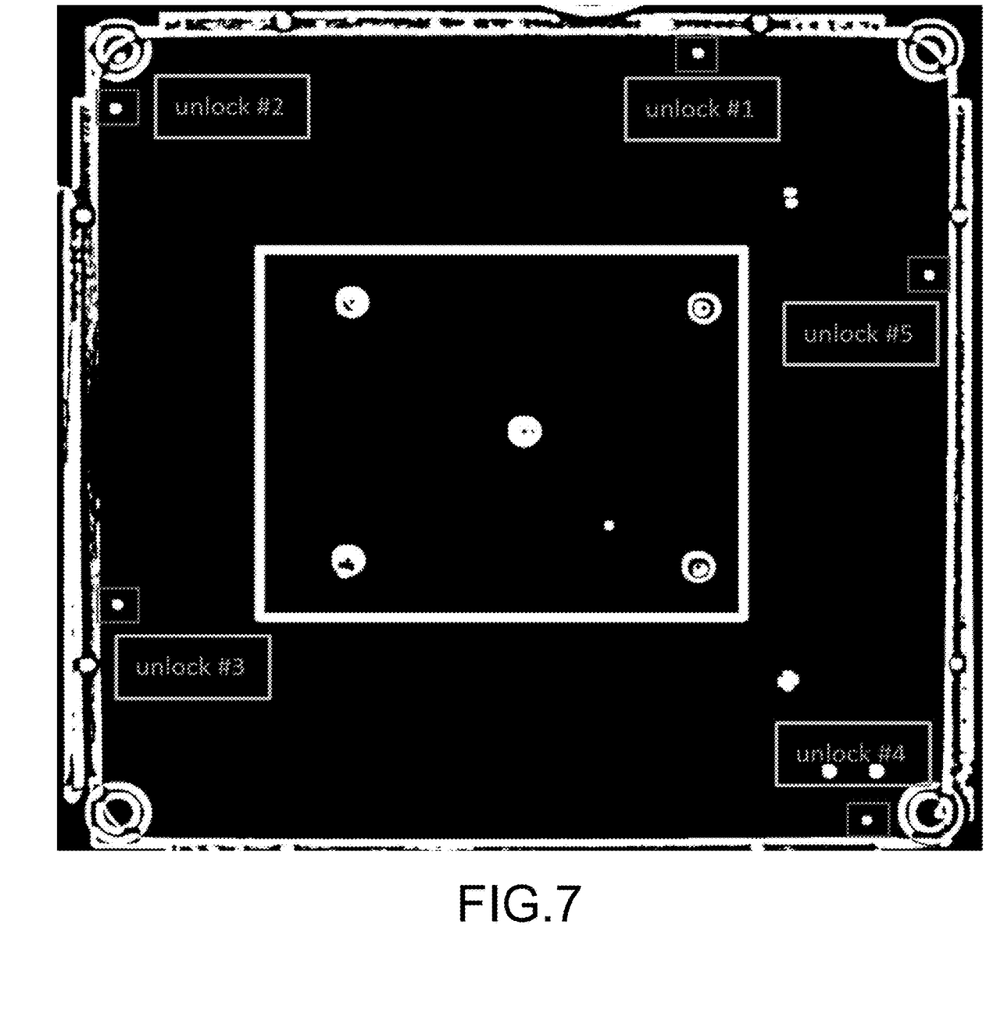
FIG. 7 shows a schematic diagram of an embodiment of the binarization image according to the present disclosure.

FIG. 7 shows a schematic diagram of an embodiment of the binarization image 112 according to the present disclosure. Please refer to FIG. 1 and FIG. 6 at the same time. The threshold value mentioned above is, for example but not limited to, a screw grayscale value of the color (for example, silver) of the at least one screw 30. When converting the grayscale image 110 into the binarization image 112 based on the threshold value, the pixels 114 including the pixel grayscale values greater than or equal to the screw grayscale value is converted into a first color (for example, black in FIG. 7, which means the antenna board 20 itself and/or the screw holes which are locked into the screws) of the binarization image 112, while the pixels 114 including the pixel gray scale values less than the screw grayscale value is converted into a second color (for example, white in FIG. 7, which means including the screw holes which are not locked into the screw) of the binarization image 112. Therefore, the operator or the microprocessor 102 can identify the screw holes into which no screw is locked, namely, the screw holes (unlock #1~unlock #5) in FIG. 7. The first color mentioned above may be white while the second color may be black; but according to the product manufacturing experience, it is easier to visually identify the problems by the white characters on the black background. In addition to using the screw grayscale value of the color of the at least one screw 30 as the threshold value, the grayscale value of the color of the antenna board 20 itself may also be used as the threshold value (if the color of the antenna board 20 itself is also silver).

The following contents describe how to perform the antenna board alignment method of the present disclosure in the form of the mathematical derivations:

In order to improve the accuracy of the edge locations of the positions of the screw holes without the locked screw on the antenna board, the equation between the antenna board and the training image (also known as the background of the antenna board) is:

$$\min_{P \in c_s} \sum_{i=1}^{N} [R(x, y) - P \otimes I_i(x, y, w, h)]. \quad \text{(Equation 1)}$$

Equation 1 expresses that the microprocessor 102 processes the original image 108 which is photographed by the camera 106 to approach the practical photograph of the antenna board 20. Moreover, $\otimes$ represents the convolution operation; the number of samples is N; the $i^{th}$ training image $I_i(x, y, w, h)$ uses the width w and the height h to become: $I_i(x, y, w, h) = I_i(x-h:x+w, y-h:y+w)$ (Equation 2).

Moreover, the antenna board P is obtained from the color set $c_s$; $I_i(x, y, w, h)$ is the $i^{th}$ training image; R is the ideal response graph (or pass-through) defined in the closer relationship of the color difference between the background and the foreground. In order to maximize the complementary color to improve the edge locations to obtain the contour of the antenna board 20, the minimum equation for the color difference between the foreground and the background mentioned in Equation 1 and Equation 2 may be rewritten as:

$$\min_{c_i, c_j \in c_s} \text{edge}(B(c_i)) \cap A(c_j), \quad \text{(Equation 3)}$$

with integers as i, j>0 (Equation 3), wherein edge($B(c_i)$) is the edge of $B(c_i)$.

Moreover, $c_s$ is the overall color set; the color set of the antenna board $B(c_i)$ has a smaller size (Width×Heigh) than the background $A(c_j)$ of the antenna board $B(c_i)$. In order to achieve the accurate edge detection, a Gaussian filter may be applied to mitigate the effect of the noises to maximize improving the signal-to-noise ratio (SNR) of the antenna board to estimate the screw positions; the equation may be written as:

$$SNR(B(x, y)) = \frac{\left| \int_{-w}^{w} G(x, y, \sigma) B_{x,y}(c) dx dy \right|}{n_0 \left[ \int_{-w}^{w} B_{x,y}^2(c) dx dy \right]^{\frac{1}{2}}}. \quad \text{(Equation 4)}$$

Moreover, G (x, y, σ) is an edge detector with a Gaussian filter; σ is the standard deviation; $B_{x,y}(c)$ is the image of the antenna board of the color set c. In order to achieve a simple calculation process, the noise effects of the image may be over-smoothed to obtain the cost function J(B(x, y)) with the accurate positions as:

$$J(B(x, y)) = \quad \text{(Equation 5)}$$

$$\frac{\left| \int_{-w}^{w} G(x, y, \sigma) B_{x,y}(c) dx dy \right|}{n_0 \left[ \int_{-w}^{w} B_{x,y}^2(c) dx dy \right]^{\frac{1}{2}}} \cdot \frac{\left| \int_{-w}^{w} G(x, y, \sigma) B_{x,y}(c) dx dy \right|}{n_0 \left[ \int_{-w}^{w} (B_{x,y}^2(c))' dx dy \right]^{\frac{1}{2}}}.$$

By maximizing the cost function J(B(x, y)), the edge detection may be achieved by calculating the angles and the positions using techniques such as the Gaussian filters and the gradient methods. Therefore, the edge detection involved in the Sobel operation to obtain the size and the direction may be described as:

$$\text{Magnitude}(\text{Edge}_H) = \quad \text{(Equation 6)}$$
$$\sqrt{(M \otimes \text{Sobel}_V)^2 + (M \otimes \text{Sobel}_H)^2} > \text{Threshold},$$

with Vertical(V) and Horizontal(H) directions.

Moreover, M is the mask array; the direction angle may be written as:

$$\theta = \tan^{-1}\left(\frac{\text{Sobel}_V}{\text{Sobel}_H}\right). \quad \text{(Equation 7)}$$

In order to improve the positioning accuracy of the antenna board, the minimum value optimization problem of the given training points $t_j$ (vents) in the designed holes of the antenna board may be expressed as:

$$\hat{r}_{opt,j} = \min_{1 \leq i \leq m} \sum_{j=1}^{n} \|R_{xy}(\hat{r}_{j,i}) - t_j\|_2^2 \text{ with } t_j = R_{xy}(\hat{r}_{j,i}) + \Delta. \quad \text{(Equation 8)}$$

With Equation (8), the disclosure considers that simulation parameters utilize the n=4 inner points (called vents) of the antenna board 20 and then n=4 edges in the contour of antenna board 20 as location point to estimate the photograph of the practical antenna board 20. Moreover, Δ is the error term; $t_j$ is the $j^{th}$ designed hole in the actual antenna board; 1≤j≤n; the image processing for the antenna board is approximated as the plane $R_{xy}(\hat{r}_{j,i})$; the estimated sample is 1≤i≤m; the estimated plane $R_{xy}(\hat{r}_{j,i})$ and the estimated optimal point $\hat{r}_{opt,j}$ are used to approximate the $t_j$ position of the actual antenna board.

The advantage of the present disclosure is to provide a simple and accurate antenna board alignment method.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. An antenna board alignment method comprising:
    finding a central positioning point on an antenna board to locate a positioning rectangle by a microprocessor;
    finding four inner positioning points on the positioning rectangle to locate the antenna board by the microprocessor; and
    finding a plurality of outer positioning points at a plurality of edge locations on the antenna board to locate at least one edge of the antenna board by the microprocessor.

2. The antenna board alignment method of claim 1, wherein the antenna board is a rectangular antenna board.

3. The antenna board alignment method of claim 2, wherein the four inner positioning points are four heat radiation holes on the antenna board.

4. The antenna board alignment method of claim 3, wherein the microprocessor is configured to use a camera to photograph the antenna board to find the central positioning point, the positioning rectangle, the inner positioning points, and the outer positioning points.

5. The antenna board alignment method of claim 4, further comprising:
    placing the antenna board in a place before the microprocessor finds the central positioning point on the antenna board, wherein a setting color of the place is different from an antenna board color of the antenna board.

6. The antenna board alignment method of claim 5, wherein the setting color is black.

7. The antenna board alignment method of claim 6, wherein the antenna board color is silver.

8. The antenna board alignment method of claim 7, wherein the edge locations are four corners of the rectangular antenna board.

9. The antenna board alignment method of claim 8, wherein a positioning number of the outer positioning points is four.

10. The antenna board alignment method of claim 9, wherein an edge number of the at least one edge is four.

* * * * *